(12) United States Patent
Goeckeritz

(10) Patent No.: US 11,313,997 B2
(45) Date of Patent: Apr. 26, 2022

(54) OPTICAL ELEMENTS HAVING GRADIENT OPTICAL PROPERTIES

(71) Applicant: Momentum Optics, Longmont, CO (US)

(72) Inventor: Jeremy Goeckeritz, Longmont, CO (US)

(73) Assignee: Momentum Optics LLC, Longmont, CO (US)

( * ) Notice: Subject to any disclaimer, the term of this patent is extended or adjusted under 35 U.S.C. 154(b) by 509 days.

(21) Appl. No.: 16/358,499

(22) Filed: Mar. 19, 2019

(65) Prior Publication Data

US 2020/0301048 A1 Sep. 24, 2020

(51) Int. Cl.
*G02B 3/00* (2006.01)
*G02B 1/12* (2006.01)
*C03B 23/22* (2006.01)

(52) U.S. Cl.
CPC ............ *G02B 3/0087* (2013.01); *C03B 23/22* (2013.01); *G02B 1/12* (2013.01)

(58) Field of Classification Search
CPC .......... G02B 3/0087; G02B 1/12; C03B 23/22
See application file for complete search history.

(56) References Cited

U.S. PATENT DOCUMENTS 10,197,732 B2 * 2/2019 Chen ..................... C03C 21/005

* cited by examiner

*Primary Examiner* — Jack Dinh

(57) ABSTRACT

A method for creating gradient optical properties within a substrate is disclosed herein. More specifically, the present invention teaches a method whereby a material disposed on a substrate is patterned in three dimensions such that the thickness and diffusivity properties of the material can be used to regulate the diffusion of ions into the substrate. An example is given in which ions, injected into a substrate through an ion exchange process, alter the refractive index within the substrate in a pre-selected fashion to form a gradient refractive index lens.

21 Claims, 4 Drawing Sheets

OPTICAL ELEMENTS HAVING GRADIENT OPTICAL PROPERTIES

BACKGROUND

The present disclosure relates generally to optical elements having gradient optical properties and particularly to providing gradient optical properties to optical elements using micro fabrication processes.

Traditional optical elements, such as lenses and prisms, are manufactured from materials with homogenous material properties. The index of refraction, for example, is constant throughout the entire optical element. However, for some time, those skilled in the art of optical system design have known that an optical element having material properties that spatially vary in a selected fashion can enhance the performance of the optical system. One such optical element is a gradient refractive index (GRIN) lens wherein the refractive index varies spatially within the lens. An advantage of using GRIN lenses in an optical system is that the system may exhibit less monochromatic aberration than a system constructed from traditional lenses.

Most gradient optical property optical elements (GO-POEs) are manufactured using a process that is identical to the fabrication process for constructing homogenous optical elements with the addition of extra processing steps for creating the gradient properties. For example, the manufacturing methods described by U.S. Pat. Nos. 5,044,737, 6,029,475, 4,929,065, and 5,630,857 use thermally fused layers of glass, frits or powders with differing optical properties to create a solid mass referred to as a "blank" from which GOPOEs can be subsequently formed and U.S. Pat. Nos. 3,486,808 and 6,147,809 disclose methods to create a refractive index gradient on the surface of a previously-fabricated homogenous optical element. The methodology of using traditional manufacturing methods and adding processing steps to create a material property gradient, assures GOPOEs will be more expensive than their homogenous optical element counterparts.

The ion exchange method has the potential to be an inexpensive manufacturing method for creating gradient properties within a planar glass substrate. For example, multiple GRIN lenses may be created simultaneously with batch fabrication methods on a glass substrate using an ion exchange process making the cost per lens relatively low. U.S. Pat. Nos. 7,223,625B2, 5,359,440, 5,104,435 and 6,816,319B2, disclose various methods by which planar GRIN lenses are manufactured. The term "planar GRIN lens" refers to a lens without physical curvature, rather having a gradient refractive index distribution within a glass body capable of focusing or diverging incident light. These manufacturing processes, however, do not allow aspherical lenses to be created or the size of the lenses to be scaled—the largest practical lens size being limited to a diameter of approximately 1 mm.

SUMMARY OF THE INVENTION

The present invention recognizes that current methods for manufacturing GOPOEs are more expensive than the traditional methods of manufacturing homogeneous optical elements. While the cost of manufacturing micro optical elements (e.g. micro lens arrays) with gradient properties on a substrate is relatively inexpensive, these optical elements are limited to small sizes and the distribution of gradient optical properties within the substrate is not easily controlled. Accordingly, the present invention introduces a method of manufacturing optical elements that substantially obviates one or more of the limitations and disadvantages of the related art.

The present invention includes a method for creating gradient optical properties within a light transmissive article. The created article is preferably a planar substrate such as a glass plate or disc. A gradation in the optical properties of the substrate is created by diffusing ions into the substrate. Optical properties such as refractive index, chromatic dispersion, reflectivity, transmissivity, etc. may be altered by the ions. The ion diffusion process may include an ion exchange between the substrate and a molten ionic solution, high-energy ion implantation followed by thermal diffusion (i.e. thermal drive-in) or any other ion diffusion process commonly used within the semiconductor and microelectromechanical systems (MEMS) industries. The distribution or profile of the ions within the substrate is spatially controlled using a relief patterned material on the surface of the substrate. Based on the patterned material's diffusivity and thickness, and the diffusion process time, ions are controllably delayed or prevented from diffusing into the substrate. The patterned material is thus referred to herein as the diffusion regulating material (DRM). The DRM thickness may change in a linear and/or nonlinear taper or in an abrupt step-like manner to control the diffusion of ions into the substrate in a prescribed fashion. The ions diffused into the substrate may form a profile that is approximately spherical, elliptical, parabolic, hyperbolic, aspherical or one of many other desirable shapes. Moreover, the areal size of the pattern formed within the DRM may extend from tens of square micrometers to hundreds of square millimeters so as to create GOPOEs with like dimensions.

There are several methods by which the DRM may be formed. For example, the DRM may be created by uniformly diffusing ions into the top surface of a glass substrate to change the diffusivity properties of the surface. The substrate surface is then etched to create a surface relief pattern of variable thickness. Alternatively, a film with desirable diffusivity properties may be deposited onto the surface of the substrate and a pattern then created in the film. Still yet, the DRM may be created by bonding a glass disc to the substrate, the glass disc having lower diffusivity than the substrate. The glass disc can then be ground to a desired thickness, polished, and patterned in three dimensions to create the DRM.

The surface relief patterns in the DRM may be created with semiconductor processing tools and techniques. For example, processes such as photolithography, vacuum deposition, wet and dry etching may be used to pattern the DRM. Specifically, grayscale lithography followed by dry or wet etching may be used to create the surface relief pattern or a mask may be placed in close proximity to the substrate and dry etching may be used to form the pattern. In the latter method, the mask is called a "shadow" mask.

With the disclosed method, a multiplicity of GOPOEs may be fabricated at once thereby reducing manufacturing time and costs compared to traditional mechanical processing of individual optical elements. Furthermore, depositing films on batches of optical elements would likewise result in a cost savings. A substrate of GOPOEs may collectively receive prescribed coatings to prevent light reflection (i.e. anti-reflection coatings) or to filter color or infrared light. Moreover, a substrate of optical elements may be coated in a light blocking film and openings formed in said film using standard semiconductor processing techniques so as to create apertures over the GOPOEs.

A GOPOE may be removed from the substrate using dicing, dry etching, wet etching or a combination thereof. An individual GOPOE released from the substrate is herein referred to as an "optical element chip". Optical element chips may be used as individual components, abutted together to form optical systems or combined with conventional homogenous optical elements. Using dry and/or wet etching to remove the GOPOEs from the substrate enables an optical element chip to have any desired shape; for example, a chip may be rectangular or circular. Planar optical elements that are abutted to form optical systems exhibit minimal tilt error, less light reflection from air-to-substrate interfaces thus improving light transmission and have fewer exposed surfaces making them less prone to contamination.

In some embodiments, alignment marks are created using photolithography and etching to pattern a substrate containing multiple GOPOEs. Two or more of these substrates are aligned to each other using the alignment marks and then bonded to each other, thereby forming optical systems. The bonded substrates are diced to release the stacked optical element chips. Stacking the chips on a substrate-level simplifies assembly and provides tighter assembly tolerances than mechanically aligned and assembled optical elements.

In some embodiments, multiple GOPOEs are fashioned in both the top and bottom surfaces of a substrate. During fabrication, the surface relief pattern of the DRM on the bottom surface may be aligned to the patterned DRM on the top surface using backside photolithography. Ions are diffused into the top and bottom DRMs simultaneously and subsequently the ions are controllably diffused into both sides of the substrate. For example, a convex GRIN lens formed on the top substrate surface may be aligned to a concave GRIN lens on the bottom surface or any combination thereof.

In some embodiments, multiple GRIN lenses created using the disclosed methods are abutted and placed in proximity to an image sensor such as a charge-coupled device (CCD) or complementary metal-oxide semiconductor (CMOS) photodetector to form an imaging module. The spacing between the abutted lenses and the photodetector is determined by a standoff. The standoff may be fabricated during the lens forming processes by selectively removing a volume of the lens chip via etching on the side of the chip opposite the lens, closest to the photodetector.

BRIEF DESCRIPTION OF THE DRAWINGS

Many aspects of the disclosed invention can be better understood with reference to the following drawings. The components in the drawings are not necessarily to scale, the emphasis instead being placed upon clearly illustrating the principles of the present invention. In the drawings, like reference numerals designate corresponding parts throughout the several views.

FIG. 1A illustrates a substrate with a DRM at the top surface of the substrate and a diffusion barrier material disposed on the bottom surface of the substrate.

FIG. 1B illustrates the substrate of FIG. 1A with a patternable layer disposed on the DRM, said patterning layer has a surface relief pattern.

FIG. 1C illustrates the pattern transfer from the patternable layer of FIG. 1B into the DRM and the subsequent diffusion of ions into the surface of the substrate. The optical properties of the substrate are altered by the injected ions. The dotted lines represent iso-concentration regions of the ions in the substrate.

FIG. 1D illustrates the substrate after the DRM and diffusion barrier material have been removed from the substrate. The substrate may form a light converging optical element if the ions diffused into the substrate surface increase the refractive index of the substrate or a light diverging optical element if the ions diffused into the substrate decrease the refractive index of the substrate.

FIG. 2A illustrates a substrate with a DRM patterned on the top surface of the substrate and a diffusion barrier material disposed on the bottom surface of the substrate. The DRM is patterned to allow ion diffusion into the substrate preferentially at the periphery of the substrate. The dotted lines represent iso-concentration regions of the ions in the substrate.

FIG. 2B illustrates a planar GOPOE after the top DRM and the bottom diffusion barrier material have been removed from the substrate. The optical element may diverge light if the ions diffused into the substrate increase the refractive index of the substrate or the optical element may converge light if the ions diffused into the substrate decrease the refractive index of the substrate.

FIG. 3A illustrates a substrate after a second ion exchange process removes the ions injected into the substrate during the first ion exchange process.

FIG. 3B illustrates a GOPOE after the top DRM and the bottom diffusion barrier material have been removed from the substrate. The dotted lines represent iso-concentration regions in the substrate.

FIG. 4A illustrates a substrate with a DRM on the top and bottom surfaces of the substrate.

FIG. 4B illustrates the substrate of FIG. 4A after the top DRM has been patterned.

FIG. 4C illustrates the substrate of FIG. 4B after the bottom DRM has been patterned.

FIG. 4D illustrates the substrate of FIG. 4C after ions have been diffused into the substrate and the subsequent removal of the DRMs from the top and bottom surfaces. The ion concentration in the substrate is represented by iso-concentration dotted lines.

DETAILED DESCRIPTION OF THE INVENTION

The following description of the preferred embodiment(s) is merely exemplary in nature and is in no way intended to limit the invention, its application, or uses. For example, while one preferred embodiment of the present invention is a GRIN lens, those skilled in the art of optical element design, will be aware that other optical elements such as prisms, waveguides and diffractive optical elements (DOE) can be fashioned using the disclosed methods.

The present invention relates to a method whereby the diffusion of ions into a substrate is spatially controlled by a three dimensionally patterned DRM. The DRM controllably delays or prevents passage of ions into the substrate based on the diffusion time and the variable thickness and diffusivity of said DRM. The optical properties of the substrate are altered commensurate with the ion concentration within the substrate. Thus, gradient optical properties are created where there are ion concentration gradients. In a preferred embodiment of the present invention, an ion exchange process using a hot ionic solution is used to diffuse ions into the DRM and subsequently into the substrate. Other techniques commonly known to those familiar with the art may be used to introduce ions into the substrate as well, such as implanting ions into the DRM with an ion gun and then thermally diffusing the ions through the DRM and into the substrate.

Figure 1A:
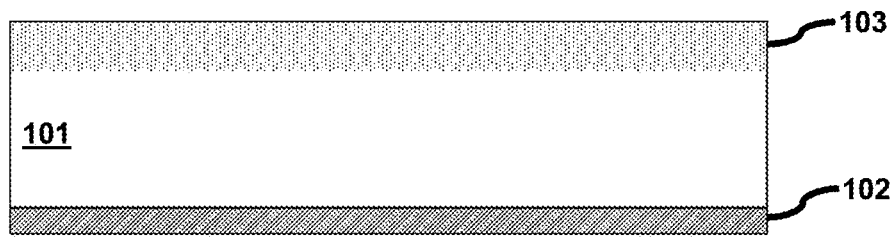
FIGS. 1A-D illustrate the cross-sectional views of a GOPOE at various stages of manufacture.

In accordance with an aspect of the invention, FIGS. 1A, 1B, 1C and 1D illustrate a fabrication process 100 for creating a GRIN lens 111. FIG. 1A shows the cross section of a transmissive substrate 101 with a diffusion barrier material 102 disposed on the bottom surface of the substrate 101. The substrate 101 has a planar top and bottom surface, said surfaces being parallel. A DRM 103 is disposed on the top surface of the substrate 101. The DRM 103, for example, may be a film, a glass layer bonded to the substrate 101 or a layer within the surface of the substrate that has a different diffusivity than the bulk substrate 101, for example, by altering the surface of the substrate through a uniform ion exchange process. The DRM is selected to have a desired diffusivity to control the transport of ions into the substrate.

Figure 1B:
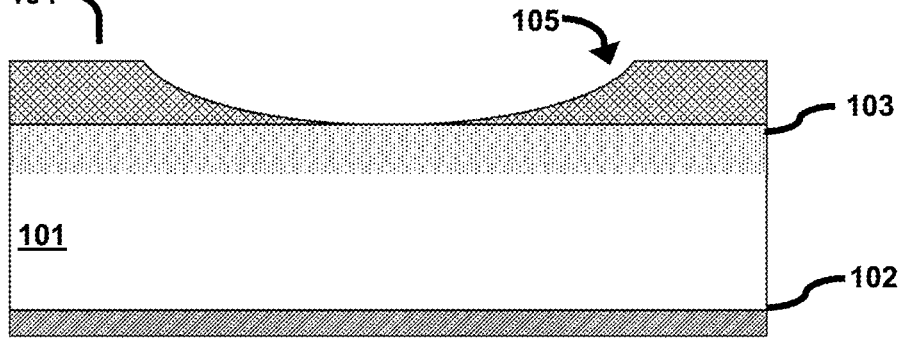

FIG. 1B shows a photoresist layer 104 disposed on the DRM 103. The photoresist layer 104 may be patterned using a grayscale lithography process to create a surface relief pattern of variable thickness 105, or the photoresist 104 may be patterned using any number of other methods known within the art. For example, the photoresist 104 may be patterned using a grayscale mask and a local energy dose followed by chemical development of the photoresist 104. Alternatively, the photoresist 104 may be patterned using a binary mask placed above the photoresist 104 with a gap between the binary mask and the photoresist. An energy dose is applied to the photoresist 104 through the transparent regions of the mask and under opaque regions of the mask adjacent to the transparent regions through the gap between the mask and the substrate. The photoresist 104 is chemically developed. The photoresist pattern 105 may be transferred to the DRM 103 using wet or dry etching or a combination thereof. The photoresist is subsequently removed from the substrate 101.

Figure 1C:
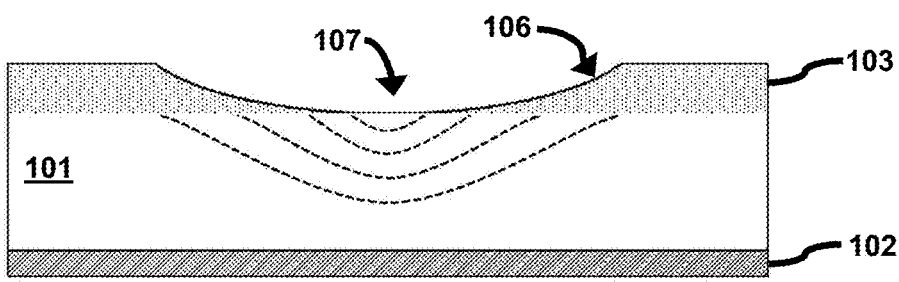

FIG. 1C shows the transfer of the photoresist pattern to the DRM 103, said DRM having a thickness gradation 106 generally matching the shape of the photoresist surface relief pattern 105. The substrate 101 is placed in a high temperature ionic solution such as a salt bath to exchange ions between the bath and the substrate 101. The ions diffuse into the substrate beginning at the thinnest portion of the DRM 107. The diffusion rate of the ions is determined by the DRM 103 thickness and diffusivity properties. Gradually ions diffuse through thicker portions of the DRM and said ions then diffuse into the substrate 101. The ions from the ionic solution are exchanged with the ions in the substrate thereby creating a refractive index gradation. Ions in the substrate diffuse out of the substrate through the DRM and into the ionic solution thereby maintaining a charge balance within the substrate and thus completing the ion exchange process. The dashed lines 108 represent the iso-concentration of ions in the substrate and thus the iso-refractive index in this case. The refractive index change is greatest at the surface of the substrate at the location of the thinnest DRM 107 and decreases radially and axially outward from this region.

Figure 1D:
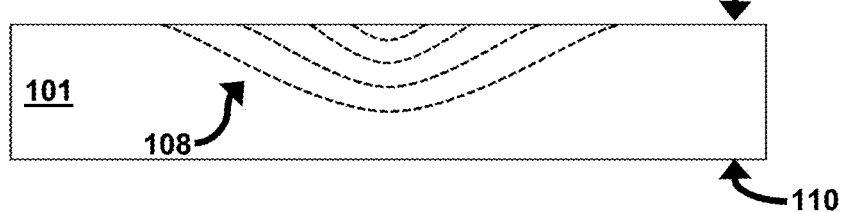

FIG. 1D shows a planar GRIN lens 111. The lens may be light converging or diverging depending on the change in refractive index within the substrate. Typically, the ion exchange process will increase the refractive index of the substrate, for example, by exchanging Silver in a salt bath for Sodium in the substrate. However, the refractive index may be reduced, for example, by the exchange of Sodium in an ionic solution for Potassium within a substrate. In the former case the planar lens 111 is converging and in the latter case the lens 111 is diverging. The diffusion barrier material 102 and the DRM 103 are removed from the substrate 101 using wet etching, dry etching, surface polishing or a combination thereof. The top surface 109 and the bottom surface 110 of the substrate are subsequently polished.

In some embodiments of the invention, the DRM 103 may be patterned using other grayscale lithography techniques. The term "grayscale lithography" is used in a broader sense herein to encompass techniques that may, or may not, employ photoresist. For example, a simple gradation in thickness of the DRM 103 may be created using a physical mask and dry etching. The physical mask is placed above the DRM 103 with a gap between the mask and the DRM 103. The DRM 103 is etched using physical ion etching and/or reactive ion etching. Ions bombard the surface of the DRM with higher frequency at the center of the mask opening and with less frequency at the periphery of the mask opening leading to a gradation in etching with preferential etching occurring at the center of the mask opening. Alternatively, the mask may be placed in contact with the DRM 103 and achieve the same etching gradation provided the mask has a thickness greater than the size of the mask opening. Herein the term "high-aspect ratio" is used to refer to a ratio of mask thickness to mask opening size greater than one. Hence, a mask having a high aspect ratio opening may be used to create a gradient etch of the DRM 103. In addition, the DRM 103 may be patterned using laser ablation with greater laser intensity removing more DRM 103.

Figure 2A:
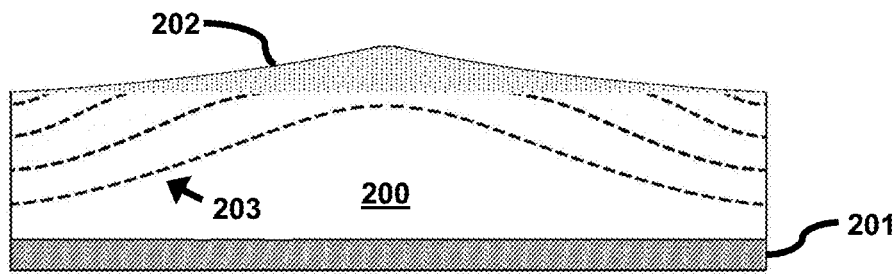
FIGS. 2A-B illustrate the cross-sectional views of the fabrication process for creating a GOPOE using a DRM that is thickest at the center of the substrate.
Figure 2B:
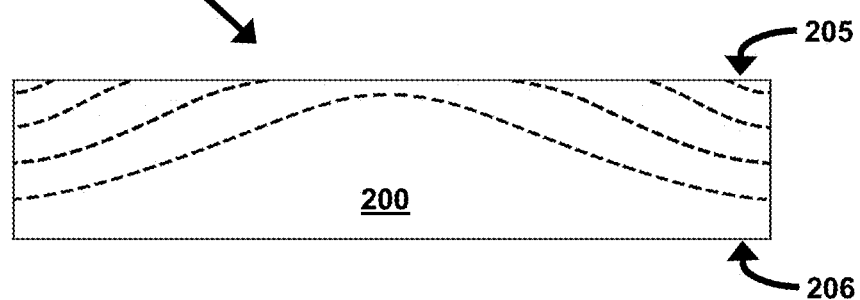

The invention, as will be readily appreciated by those skilled in the art, may be used to create many lens shapes. FIG. 2A shows a substrate 200 with a diffusion barrier 201 on the bottom surface and a DRM 202 on the top surface. The diffusion delay material 202 has been patterned such that the DRM thickness is greatest at the center of the substrate and gradually decreases toward the edges of the substrate. The DRM thickness gradation may be linear and/or nonlinear. The substrate undergoes an ion diffusion process whereby the refractive index of the substrate 200 is altered. Iso-refractive index regions are represented by dashed lines 203. Ions diffuse more deeply at the edges of the substrate relative to the center. In the case where ions from the diffusion process increase the refractive index of the substrate, the GRIN planar lens 204, as shown in FIG. 2B, is light diverging. The diffusion barrier 201 and the diffusion delay material 202 are removed from the substrate 200 using a wet etch, dry etch, surface polish or a combination thereof. Finally, the top surface 205 and the bottom surface 206 of the substrate are polished.

Figure 3A:
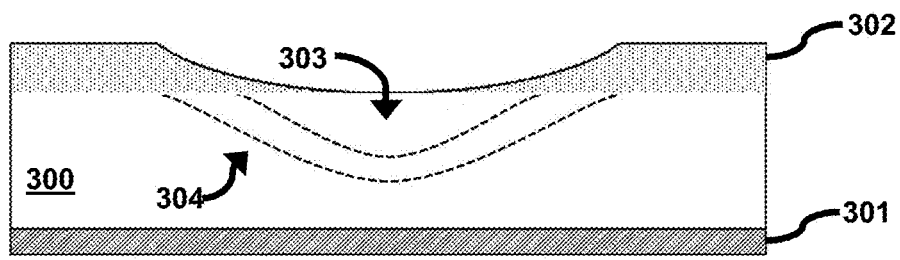
FIGS. 3A-B illustrate the cross-sectional views of the fabrication process for creating a GOPOE using two or more ion exchange processes.
Figure 3B:
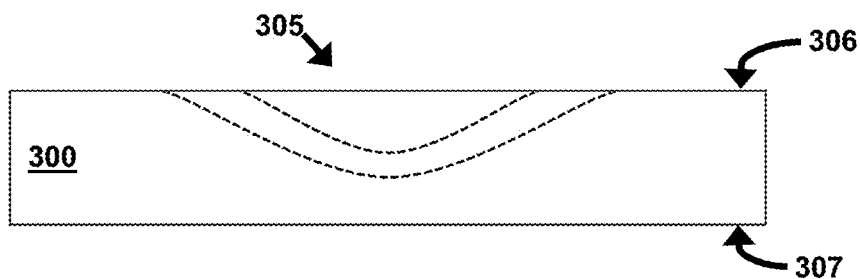

In some embodiments of the invention, alternative lens shapes may be created using the disclosed methods and multiple ion exchange processes. FIG. 3A shows a substrate 300 with a diffusion barrier 301 disposed on the bottom surface of a substrate 300 and a DRM 302 disposed on the top surface of the substrate 300. The DRM 302 is patterned using grayscale lithography. The substrate 300 is placed in a salt solution and the ion exchange process is used to change the refractive index of the substrate 300. The salt ions diffuse into the substrate based on the thickness and diffusivity of the diffusion delay material 302. The substrate is removed from the salt bath and said substrate is placed in a second salt bath. The second salt bath is used to introduce a second ion type into the substrate or return the same type of ion removed from the substrate during the first ion exchange process. Region 303 shows the substrate after the second ion exchange has returned the ions removed during the first ion exchange. The second ion exchange process is performed for a shorter time than the first ion exchange. The gradation of the refractive index is represented by the dashed iso-refractive index contour lines. FIG. 3B shows a meniscus planar GRIN lens 305. The DRM 302 and the diffusion barrier material 301 have been removed from the top 306 and bottom 307 surfaces of the substrate, respectively. The substrate top surface 306 and bottom surface 307 are subsequently polished.

Figure 4A:
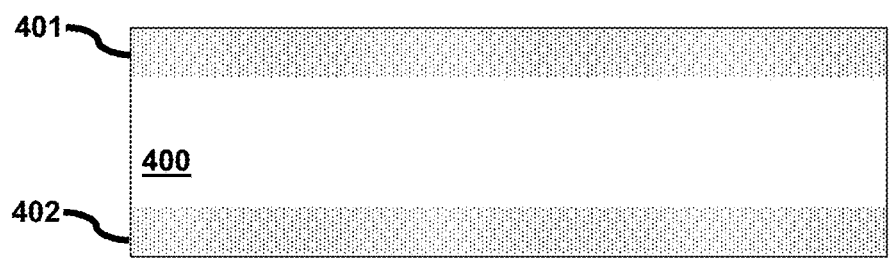
FIGS. 4A-D illustrate the cross-sectional views of the fabrication process for creating a GOPOE within the top and bottom surfaces of a substrate.
Figure 4B:
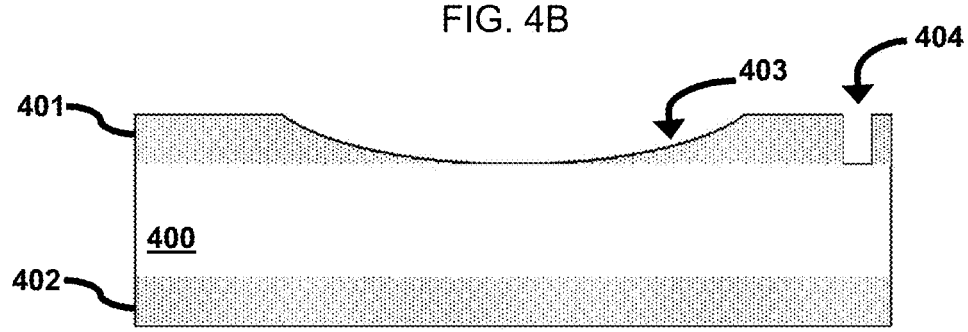
Figure 4C:
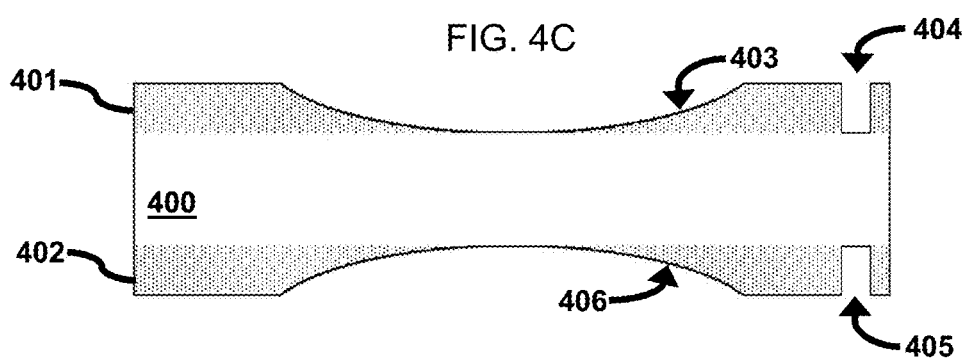
Figure 4D:
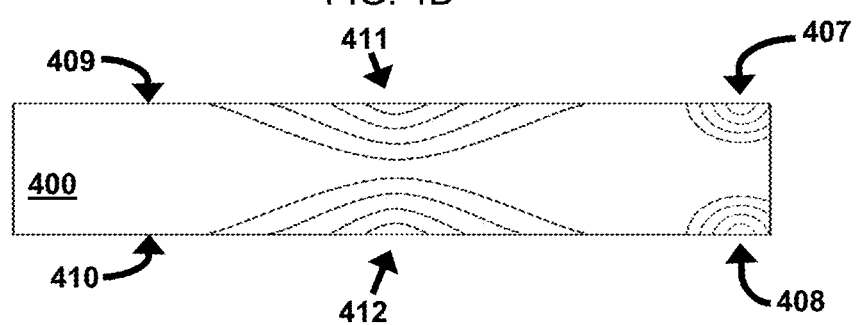

The disclosed methods can be used to create planar lenses within the top and bottom surfaces of a single substrate. FIG. 4A shows a substrate 400 with a DRM 401 disposed on the top surface and a DRM 402 disposed on the bottom surface. These DRMs may be identical or different materials depending on the diffusivity properties needed to create a desired lens shape. FIG. 4B shows the top DRM 401 patterned with a gradual slope 403 and an alignment mark 404. The top DRM 401 may be patterned for example using grayscale photolithography and etching. In FIG. 4C, an alignment mark on the bottom surface 405 is aligned to the alignment mark on the top surface 404, thereby allowing a pattern on the bottom surface to be aligned with a pattern on the top surface. The bottom DRM 402 is patterned with a desired taper 406, as illustrated in FIG. 4C. Ions are diffused into the substrate 400 through the DRMs on both sides of the substrate. The depth of the ion diffusion in the substrate is regulated by the diffusivity and thickness of the DRMs and the diffusivity of the substrate. Incidentally, ions also diffuse through the alignment marks. The ions diffused through the top alignment mark 407 do not overlap with ions diffused through the patterned DRM 401 on the top surface, as illustrate in FIG. 4D. Likewise, ions diffused through the bottom alignment mark 408 are far enough away from ions diffused through the bottom DRM 402 so as to not overlap. The DRMs are removed from the substrate 400 and top surface of the substrate 409 and the bottom surface 410 of the substrate are polished. FIG. 4D shows a top GRIN lens 411 and a bottom GRIN lens 412 created in the substrate 400. The lenses may be converging if the refractive index of the substrate 400 is increased by the diffused ions or diverging if the refractive index of the substrate 400 is decreased by the diffused ions. The dotted lines represent the ion iso-concentration.

Figure 5:
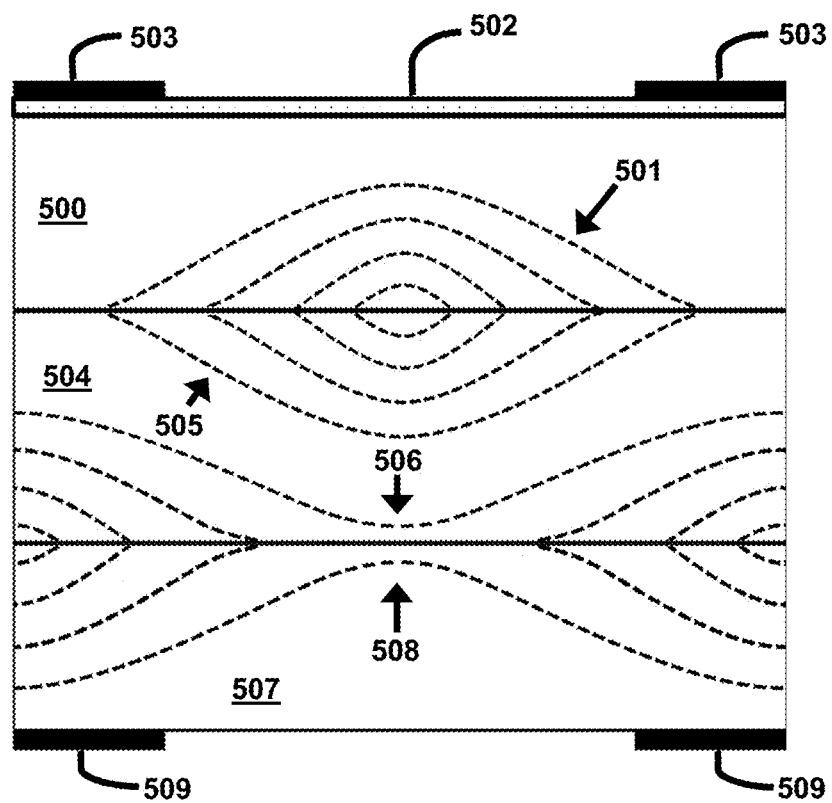
FIG. 5 illustrates the cross-section of three substrates with planar GRIN lenses abutted to form an optical system composed of a bi-convex GRIN lens and a bi-concave GRIN lens. An aperture and optical coating are shown on the top surface of the optical system. A second aperture is shown on the bottom surface of the optical system.

In some embodiments of the invention, planar GRIN lenses may be used to form optical systems. FIG. 5 shows a top substrate 500 with a planar GRIN lens 501. The top surface of the top substrate 500 may be coated with an anti-reflection (AR) coating 502 via, for example, vacuum deposition. The top surface may receive other coatings such as infra-red (IR) filter, color filter or scratch-resistant coatings. A film aperture 503 may be disposed on the AR coating. The aperture 503 is created by disposing an opaque film via, for example, vacuum deposition on the top surface of the top substrate 500 and patterning the film using photolithography and etching. Alternatively, to avoid inadvertently etching the AR coating 502, the aperture 503 may be created by placing a mask over the lens thereby only allowing a film to be disposed on the areas of the substrate adjacent to the lens.

The top substrate 500 may be abutted to a middle substrate 504. The substrates may be held together using an optical adhesive, spin-on-glass or a bonding technique such as fusion bonding. The middle lens has an upper GRIN lens 505 and a lower GRIN lens 506. The middle substrate 504 may be abutted to a bottom substrate 507. The bottom substrate has a single GRIN lens 508. A film aperture 509 may be disposed on the bottom surface of the bottom substrate 507. As will be readily appreciated, other apertures or coatings may be placed on any surfaces within the optical system as desired before abutting the substrates.

Figure 6:
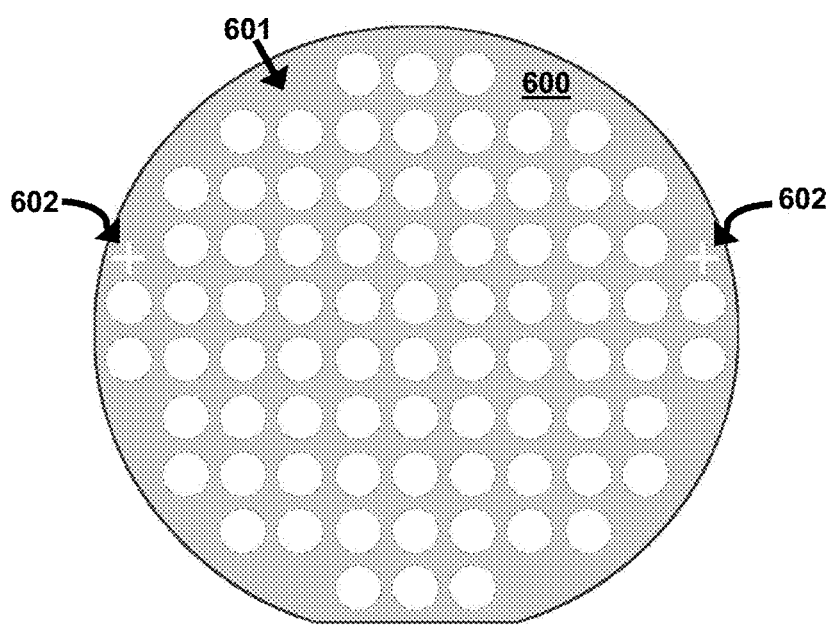
FIG. 6 illustrates the surface of a substrate with an array of GOPOEs fabricated using the methods disclosed in the present invention.

Multiple planar GRIN lenses are fabricated simultaneously on a substrate. FIG. 6 shows a substrate 600 with multiple lenses 601 created using the disclosed methods. Microfabrication tools and processes common in the semiconductor electronics industry are used to create a batch of lenses simultaneously on a single substrate. All lenses receive film coatings at the substrate level. Moreover, all lenses may be simultaneously polished. Lenses are removed from the substrate using dicing, wet etching, dry etching or any combination thereof.

In some embodiments of the invention, two or more substrates may be aligned to each other using alignment marks 602 and bonded to form optical systems. The substrates are coated with an optical adhesive or spin-on-glass prior to alignment and then cured once they are aligned. Alternatively, substrates may be coated with a metal film such as gold and anodically bonded to together. The metal film may be patterned using standard photolithography and etching processes prior to bonding. Following substrate bonding, stacked optical lenses are removed from the substrate by dicing.

EXAMPLE

A glass article having desired mechanical and optical properties is selected for use as a substrate. The substrate has a sodium content greater than 5 mol % and less than 30 mol %. The thickness of the substrate may be 0.1-5 mm. The top and bottom surfaces of the substrate are polished. An ion diffusion preventing barrier material such as Silicon Nitride is disposed on the bottom surface of the substrate using chemical vapor deposition. The substrate is placed in a $KNO_3$ salt solution at an elevated temperature below the glass transition temperature of the substrate. Potassium ions are exchanged for Sodium ions within 1-100 µm of the top surface of the substrate. Potassium ions decrease the diffusivity at the surface of the glass substrate thereby creating a DRM in the top surface of the substrate. The DRM is coated in photoresist. The photoresist is patterned using grayscale photolithography and a developer solution to create a three-dimensional surface relief patterns in the photoresist. The photoresist patterns are transferred to the DRM via dry etching. The photoresist is removed from the substrate using a solvent and the substrate is rinsed in deionized water. The substrate is placed in a high temperature salt bath consisting of $AgNO_3$ and $NaNO_3$ in a 10:90 ratio. Silver ions diffuse into the DRM layer and eventually into the substrate according to the variable thickness and diffusivity of the DRM. The Sodium ions in the glass are exchanged for Silver ions from the salt bath. The Silver ions diffuse 10-5000 µm into the substrate at the area of the thinnest DRM and diffuse less deeply into the areas underneath the thickest areas of the DRM. The substrate is removed from the salt bath. The resulting refractive index profile in the substrate under the DRM is axially and radially varying with a gradation in refractive index that decreases generally with the square of the distance from the surface of the substrate toward the interior of the substrate. The ions diffused into the substrate increase the refractive index of the glass by 0.01 to 0.18. The refractive index change and the profile of the refractive index gradient in the glass forms an optical lens. The top surface of the substrate is ground and polished to remove the DRM. Similarly, the bottom surface is ground and polished to remove the diffusion barrier. The lens is removed from the substrate by dicing.

As the embodiments of the invention presented above and other variations and combinations of the features previously discussed can be utilized without departing from the present invention, the foregoing description of the preferred embodiments should be taken by way of illustrating rather than by way of limitation of the invention as defined by the claims.

The invention claimed is:

1. A method for constructing optical elements with gradient optical properties within at least a portion of a substrate, wherein the substrate has a top and bottom surface, the method comprising:
    providing a substrate having a material on the top surface thereof and a film on the bottom surface thereof, the material having a diffusivity lower than the diffusivity of the substrate, the film forming an ion diffusion preventing mask;
    forming a surface relief pattern of variable thickness in the material; and
    diffusing ions into the top surface of the substrate using the patterned material as a semi-permeable mask, the distribution of the diffused ions into the substrate being moderated by the duration of the diffusion process, the thickness of the material, and diffusivity properties of the material.

2. The method of claim 1, wherein the material is a film deposited on the top surface of the substrate using a vacuum deposition process.

3. The method of claim 2, wherein the material is 0.1-10 µm thick.

4. The method of claim 1, wherein the material is created by uniformly diffusing ions into the top surface of the substrate thereby changing the diffusivity properties of the top surface of the substrate.

5. The method of claim 4, wherein the material (i.e. the ion diffusion depth) is generally 1-1000 µm thick.

6. The method of claim 4, wherein ions are diffused into the top surface of the substrate using an ion exchange process.

7. The method of claim 1, wherein the material is a second substrate bonded to the top of the first substrate, the second substrate is ground to a material layer and the surface of the material layer is then polished.

8. The method of claim 7, wherein the material layer after polishing is 1-1000 µm thick.

9. The method of claim 1, wherein the surface relief pattern is created using one or more of grayscale photolithography, shadow masking, etching and laser ablation.

10. The method of claim 1, wherein the film and material are removed from the substrate using one or more of wet etching, dry etching, grinding, and polishing.

11. The method of claim 1, wherein ions are diffused into the substrate using an ion exchange process, the ions being any number of monovalent ions such as Li, Na, K, Rb, Cs, Cu, Ag or Tl.

12. The method of claim 1, wherein ions are diffused into the substrate by implanting ions into the material and thermally annealing the material and substrate, thereby diffusing ions into the substrate.

13. The method of claim 1, wherein the ions diffused into the substrate create a gradient refractive index in three dimensions within the substrate, the profile of the gradient refractive index being generally convex or concave thereby forming a GRIN lens within the substrate.

14. The method of claim 1, wherein the optical elements are removed from the substrate by using one or more of dicing, wet etching, and dry etching.

15. The method of claim 1, wherein an opaque film is disposed on the top surface of the substrate and an aperture is created in the opaque film over areas of the substrate that contain optical elements, the method comprising:
    disposing a photoresist over the surface of the substrate;
    patterning the photoresist such that only areas of the substrate with optical elements are covered with photoresist;
    disposing an opaque film on top of the substrate and the patterned photoresist, the thickness of the opaque film being less than the photoresist thickness such that the opaque film on the substrate is not contiguous with the film on top of the photoresist; and
    removing the opaque film on top of the photoresist by selectively etching the photoresist without etching the substrate or the opaque film, thereby removing the opaque film from the areas of the substrate with optical elements.

16. The method of claim 1, wherein a film is disposed on the top surface of the substrate, an alignment mark is patterned in the film and the alignment mark is transferred to the substrate by etching.

17. Providing a first substrate and a second substrate, according to claim 16, and attaching the first substrate to the second substrate by aligning the first substrate's alignment mark with the alignment mark of the second substrate and then bonding the first substrate to the second substrate such that the optical elements within both substrates are aligned with each other in a prescribed fashion.

18. The method of claim 17, wherein the first substrate is bonded to the second substrate using one or more of a transparent adhesive, anodic bonding, fusion bonding, and laser bonding.

19. The method of claim 1, wherein a setback is created in the substrate by:
    depositing films on the top and bottom surfaces of the substrate;
    patterning the bottom film to create an opening in the bottom film thereby exposing the bottom substrate surface;
    etching the bottom substrate surface via wet or dry etching for a predetermined amount of time; and
    removing the top and bottom films by selectively dry etching or wet chemical etching whereby the etching removes the films without etching the substrate.

20. The method of claim 1, wherein a second ion diffusion process is performed to inject a second type of ion into the top surface of the substrate more shallowly than the ions injected into the substrate during the first ion diffusion.

21. The method of claim 20, wherein the first and second ion diffusions are ion exchange processes and the ions removed from the substrate during the first ion exchange are returned to the substrate during the second ion exchange.

* * * * *